Oct. 24, 1933.　　　　　C. F. ROSS　　　　　1,931,708
SPRING DEVICE
Filed Oct. 31, 1929　　　2 Sheets-Sheet 1
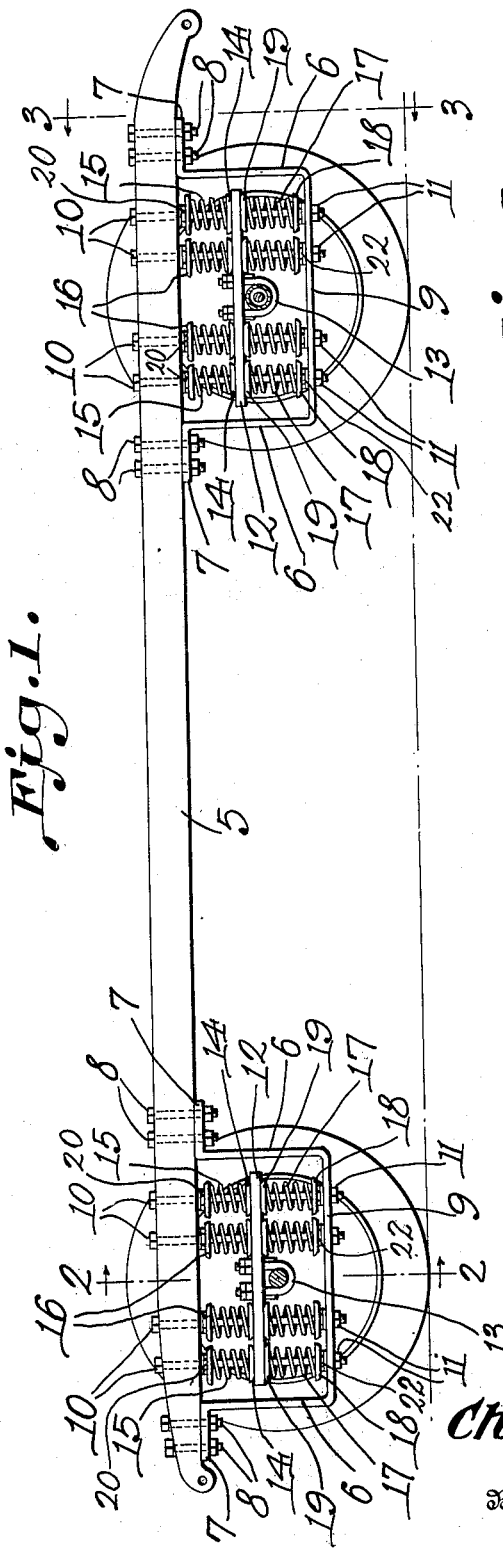
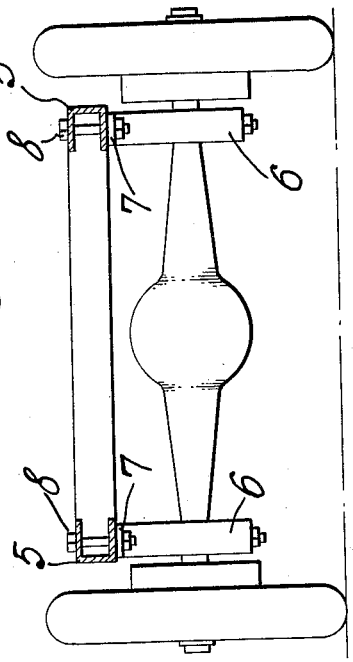
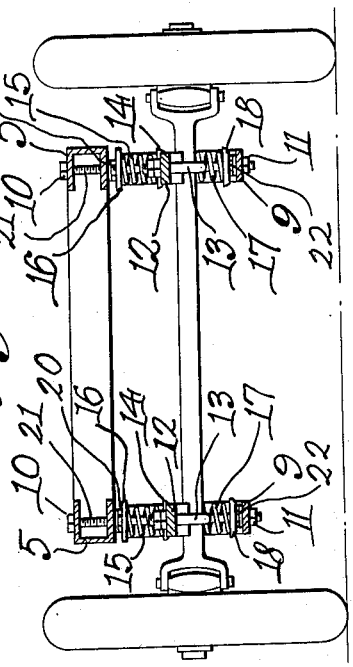
Charles F. Ross Inventor
By CASnow&Co.
　　　　Attorneys.

Oct. 24, 1933.   C. F. ROSS   1,931,708

SPRING DEVICE

Filed Oct. 31, 1929   2 Sheets-Sheet 2

Charles F. Ross, Inventor

Patented Oct. 24, 1933

1,931,708

UNITED STATES PATENT OFFICE 1,931,708

SPRING DEVICE

Charles F. Ross, Garrett, Ind.

Application October 31, 1929. Serial No. 403,860

1 Claim. (Cl. 267—60)

This invention relates to a spring device designed for use in connection with motor vehicles.

The primary object of the invention is to provide a spring device of this character which will act to cushion the movements of the vehicle against the rebound, incident to the vehicle passing over an irregularity in the road surface.

A further object of the invention is to provide double acting springs so positioned with respect to the chassis and axles of the vehicle as to greatly enhance the riding qualities of the vehicle.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view of a vehicle equipped with a spring device constructed in accordance with the invention.

Figure 2 is a sectional view taken on line 2—2 of Figure 1;

Figure 3 is a sectional view taken on line 3—3 of Figure 1.

Figure 4:
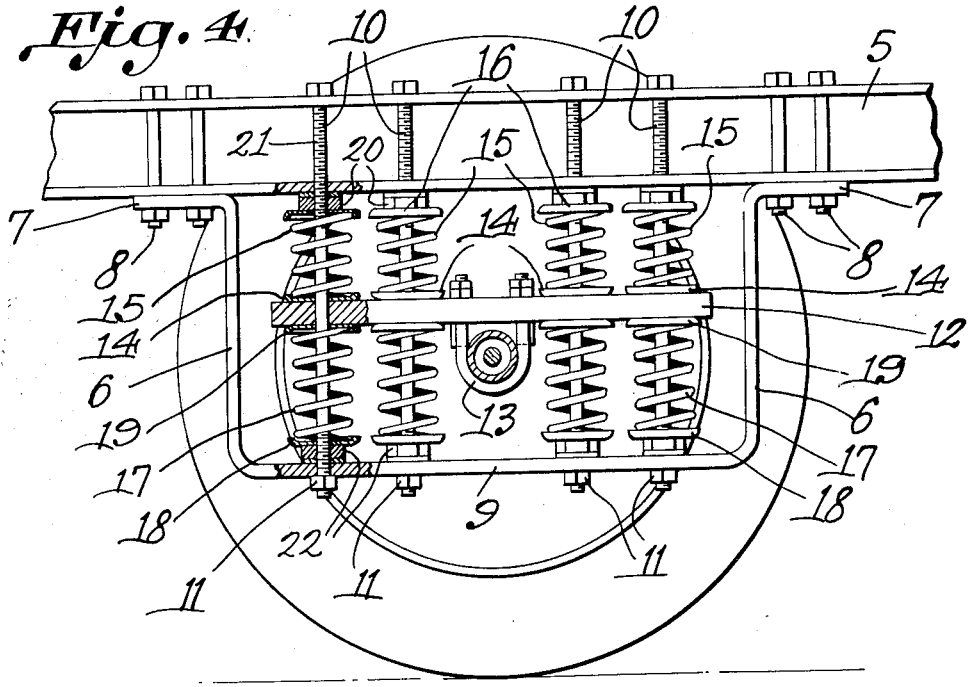
Figure 4 is an enlarged elevational view of the spring device, parts thereof being shown in section.

Referring to the drawings in detail, the reference character 5 designates the side rails of the chassis of a motor vehicle, to which the spring device constructed in accordance with the invention, is applied. The spring device includes a support embodying a bar constructed to provide spaced leg members 6 formed with right angled extremities 7 to be bolted to the under surface of the side rail of a chassis, by means of bolts such as indicated at 8.

The portion between the leg members 6, and which is indicated by the reference character 9, provides a supporting bar for the springs which are held in position by means of the bolts 10 that extend through openings in the side rail of the chassis, the threaded ends thereof extending through the supporting bar 9 where they are supplied with nuts 11 for holding the bolts in position.

These bolts 10 also pass through the movable bar 12 that is provided with openings to receive the ends of the U bolts 13 that embrace portions of the axle, with which the device is used, as clearly shown by Figure 1 of the drawings. Positioned on the bar 12, are cups 14 that receive the lower ends of the coiled springs 15, the upper ends of the coiled springs 15 being held in the cups 16 that bear against the nuts 20 which are positioned on the upper threaded portions 21 of the bolts 10 to adjustably mount the cups 16.

Coiled springs 17 have their lower ends resting in the cups 18, that are adjusted longitudinally of the bolts 10 by means of the adjusting nuts 22, the upper ends of the coiled springs 17 being held in the inverted cups 19, that rest against the bar 12. Thus it will be obvious that due to this construction movement of the chassis or axle with respect to each other, will be cushioned to enhance the riding qualities of the vehicle equipped with the spring device.

It will further be noted that due to this construction, the rebound will be cushioned to prevent sudden jerking or jarring of the vehicle.

Figure 5:
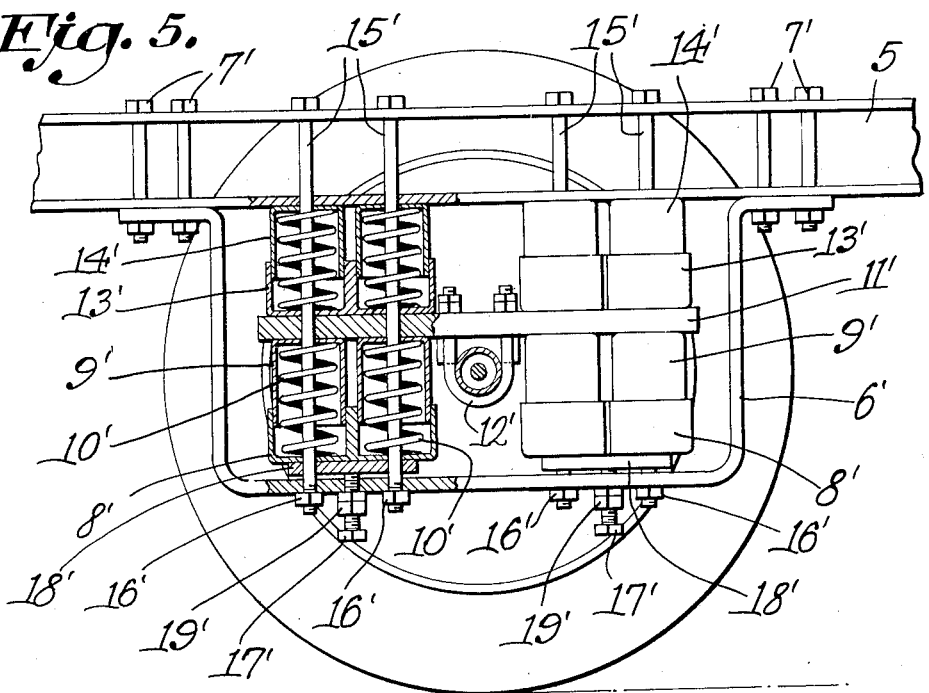
Figure 5 is an enlarged view illustrating a modified form of spring device, parts thereof being shown in section.

In the form of the invention as shown by Figure 5 of the drawings, the side rail of the chassis is indicated by the reference character 5, the support for the springs being indicated at 6', and as shown the upper ends thereof are bolted to the chassis by means of bolts 7'. Cups 8' rest on the support 6', and as shown these cups 8 are relatively long and accommodate the open ends of the tubular housing 9', in which the springs 10' are positioned.

Supported above the springs 10' is a bar 11' that is secured to the axle of the vehicle, by means of the U bolt 12'. Mounted on the bar 11', are cups 13' that receive the lower ends of the tubular spring supports 14', so that the spring supports may move within cups to prevent lateral movement of the springs while they are in operation.

The reference character 15' designates bolts that extend through the side rail of the chassis and through the supporting bar 11', the lower ends thereof being extended through openings in the supporting bar, where they are held in position by means of the nuts 16'. Adjusting screws 17' extend upwardly through the supporting bar and have their inner ends contacting with the plates 18' that in turn engage the cups. By movement of the adjusting screws, it is obvious that the cups may be moved vertically to tension the springs, or reduce the tension of the springs and consequently readjust the springs for use with a load of a particular weight.

Lock nuts 19' are positioned on the adjusting screws 17', to hold them in their positions of adjustment.

From the foregoing it will be obvious that upon downward movement of the vehicle chassis, the lowermost springs will be compressed, and upon the rebound, the upper springs will come into play to check the rebound with a cushioning effect to enhance the riding qualities of the vehicle.

I claim:

The combination with the side rail of a motor vehicle, and the axle thereof, of a spring device comprising a substantially U-shaped frame, the upper ends thereof being secured to the side rail, the intermediate portion of the frame extending under the axle, pairs of bolts having threaded end portions extending through the frame and side rail, a bar having openings through which the bolts extend, pairs of coiled springs mounted between the upper side of the bar and the bottom of the side rail, pairs of coiled springs mounted between the frame and the bar, cups slidably mounted on the bolts and in which the ends of the springs are mounted, adjusting nuts on the threaded portions of the bolts for regulating the tension of the springs, and means for securing the bar to the axle, above the axle.

CHARLES F. ROSS.